June 23, 1970   A. F. CRONE   3,516,338
LOAD TRANSFER JOINT SUPPORTS FOR PAVEMENTS
Filed April 1, 1968
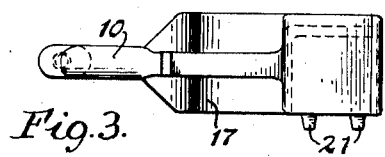
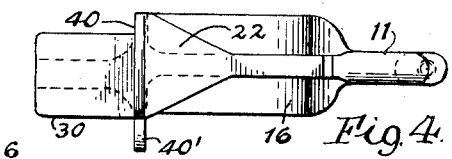
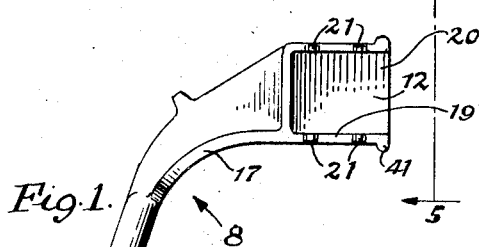
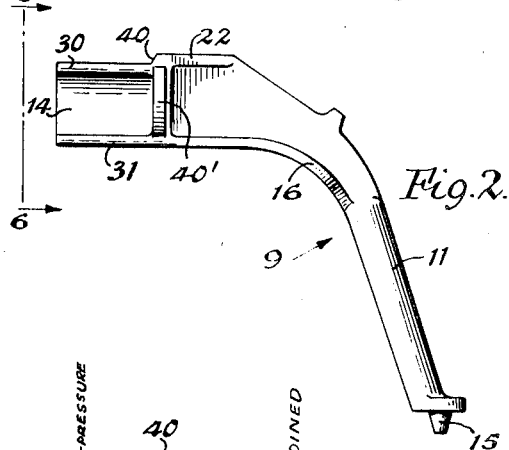
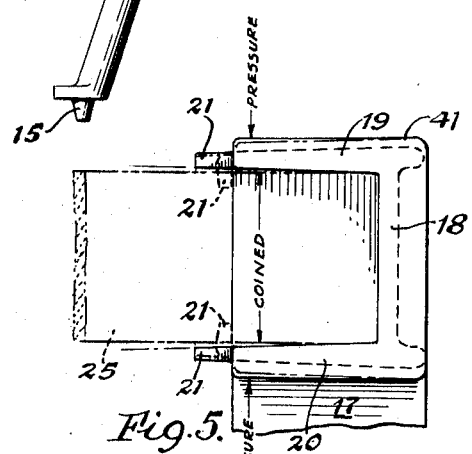
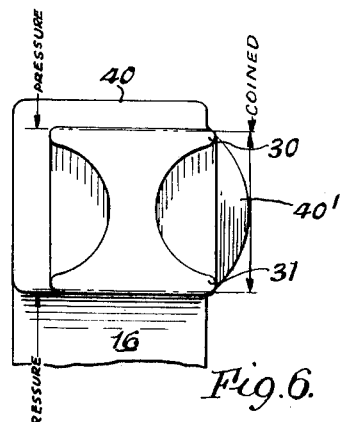
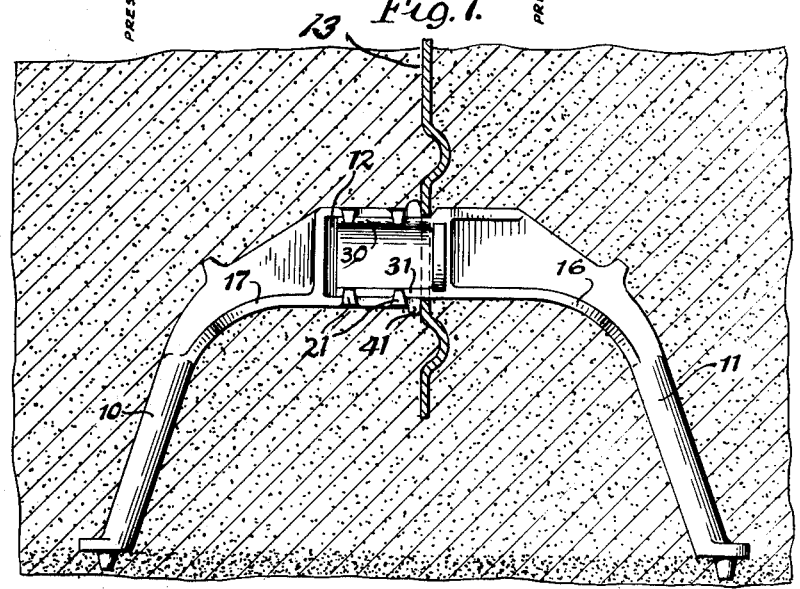
INVENTOR.
Alfred F. Crone
BY
Parker Brelman
ATTORNEYS

United States Patent Office 3,516,338
Patented June 23, 1970

3,516,338
LOAD TRANSFER JOINT SUPPORTS FOR PAVEMENTS
Alfred F. Crone, Williamsville, N.Y., assignor to Acme Highway Products Corporation, Buffalo, N.Y.
Filed Apr. 1, 1968, Ser. No. 717,689
Int. Cl. E01c *11/10*
U.S. Cl. 94—8                     2 Claims

ABSTRACT OF THE DISCLOSURE

The disclosure shows the firm securing of two parts of load transfer members together, one of which has a dowel and the other of which has an open-sided socket into which the dowel extends. The dowel is secured in the socket by pressing the two sides of the socket into intimate contact with two sides of the dowel.

---

It is very important in the construction of concrete highways that the load transfer members which connect two adjacent slabs of concrete be accurately located in the adjacent slabs so that when the slabs expand and contract, due to variations in atmospheric temperatures and when heavy vehicles pass over the joints of adjacent slabs that the forces acting on the two halves of each joint support be perpendicular. These joint supports are mounted on center plates with a number of joint supports on each center plate so that it will be obvious that all forces transferred from the adjacent pavement slabs to the joint supports must set in the same direction, since otherwise breaking of the concrete is liable to result.

It is consequently an object of this invention to provide a method of securing the two halves of a joint support securely and accurately together so that they will lie in vertical planes.

Another object is to provide an improved method of assembling the dowel and socket parts of the two halves of the joint support on a center plate to provide the assembly with greater bearing surface and more rigidity.

It is also an object to provide an improved connection between the dowel and socket parts of the two halves of a joint support by pressing parts of the socket into intimate contact with the dowel.

A further object is to smooth the faces of the parts which fit together so that irregularities on these surfaces will not interfere with the correct positioning of the parts of the joint support relatively to each other.

In the accompanying drawings:

FIG. 1 is a side elevation of a half of a load transfer member having the socket portion at the upper end thereof.

FIG. 2 is a side elevation of the other half of a load transfer member, having a dowel portion provided on the upper end thereof.

FIG. 3 is a top plan view of the half of the load transfer member shown in FIG. 1.

FIG. 4 is a top plan view of the half of the load transfer member shown in FIG. 2.

FIGS. 5 and 6 are end elevations respectively as seen from lines 5—5 and 6—6 of FIGS. 1 and 2.

FIG. 7 is a side elevation of a load transfer member arranged in a concrete pavement.

The two halves 8 and 9 of the load support member or joint support preferably have curved legs 10 and 11 and the upper ends of the legs 10, shown in FIG. 1, are provided with sockets 12, the legs 11 shown in FIG. 2, having dowels 14 formed at the upper end. These legs may be provided at their lower ends with any suitable means for resting on the subgrade such, for example, as projections 15, which may be secured to longitudinally extending base plates, not shown, resting on the subgrade. These load transfer members are secured to a center plate 13 in spaced relation to the subgrade. Other means for supporting the legs on the subgrade may be provided.

It has heretofore been customary to arrange the two halves of the transfer members at opposite sides of a center plate which is provided with holes at intervals thereon through which dowels 14 of the half 9 of each load transfer member may be passed into engagement within the sockets 12 of the other half 8 of the load transfer member and the two halves have then been secured together and to a center plate in various ways, so as to hold the two parts of the load transfer members securely and in correct relation to each other while the center plate is positioned on a road bed and the concrete poured over the same.

In accordance with my improvement I pass the dowels of the halves 9 of the load transfer members through holes in the center plate and insert them into the sockets of the other halves 8 of the load supporting members. These sockets are made with three sides, namely a side 18 from which extend the other two sides or walls 19 and 20, thus forming the three sides of the socket, the other side remaining open. I also provide at the lower wall 19 an extension or flange 17 which is integral with the lower face of the part 8, thus providing an extended surface to bear against the concrete of the slab in which this part 8 of the load transfer member is embedded. This flange greatly reduces the tendency of the concrete to break at this portion thereof. A similar flange 16 is provided as a continuation of the lower part of the dowel 14. I preferably also employ a flange 22 which extends outwardly from the upper part of the dowel 14 and is formed integral with the upper edge of the joint 9 of the joint support. This flange 22 is of approximately triangular shape, having its apex at the web of the part 9 and its base integral with the dowel and adds to the strength of the connection of the joint support in the concrete by constituting a bearing surface against the concrete.

The two sides 19 and 20 of the socket member are provided at their free ends with lugs 21 which extend outwardly beyond the sides 19 and 20, and in constructions heretofore employed the lugs have been bent inwardly into engagement with the dowels when positioned in the sockets to hold the two parts of the load transfer member in operative relation to each other.

In accordance with my invention I secure together the two halves of each load transfer member by pressing the sides 19 and 20 of the socket into frictional contact with the dowel projecting into the same. However, in order to form a correct fit between the dowels and the sockets I prefer to operate on the dowels and sockets in such a manner as to produce a correct fit and a secure gripping action of the socket with the dowel.

The load transfer members are made of metal castings and the surfaces of the various parts of the members are consequently not smooth or even, and generally have rough surfaces which preclude an accurate securing together of the two halves of a joint support. Consequently I operate on the dowels and sockets in the following manner.

The sockets are subjected to a coining or smoothing operation on the inner faces of the two walls 19 and 20 thereof, and this is done as shown in FIG. 5, by inserting between the two walls 19 and 20 a hard steel bar 25 which is of a dimension slightly larger than the space desired between the two walls 19 and 20. The bar is positioned in the space between the two walls and preferably abutting the connecting wall 18. The two walls of the socket are then positioned in a coining press which squeezes the two walls 19 and 20 toward each other against the smooth surface of the bar 25 with sufficient pressure to produce a coining effect on the inner faces of the two walls.

The outer ends of the two walls 19 and 20 are provided with integral, outwardly extending lugs or fingers 21. These fingers on the outer ends of the two walls 19 and 20 are also bent inwardly toward each other as permitted by the bar 25, but not to interfere with the insertion of the dowel into the socket. However, these inwardly bent fingers or lugs 21 serve to guide the dowel into the socket and restrain the dowel from moving out toward the open face of the socket, so that the dowel will be accurately positioned in the socket. This is done under heavy pressure for example, at least 100 tons, so that the inner faces of the two walls by being pressed against the smooth outside surfaces of the steel bar 25, are provided with the coined surfaces, which are very smooth and on which the various projections and irregularities of the cast surfaces are smoothed out.

The dowel has two flat surfaces which rest against the walls 19 and 20 of the socket and these surfaces of the dowel are pressed to a slightly smaller dimension than the inside coined surfaces of the socket walls 19 and 20 so that the dowel can be easily inserted through the center plate opening and into the socket. These two faces 30 and 31 of the dowel are pressed toward each other, in a press commonly referred to as a "coin press" which applies a heavy pressure against the two faces 30 and 31 so that the irregularities in the surface resulting from the casting of the dowel are flattened out to produce smooth coined surfaces 30 and 31 which will fit into the smooth or coined surfaces of the two walls 19 and 20 of the socket, with much greater accuracy than can be obtained by cast surfaces.

The two parts of the joint support are now positioned in operative relation to each other by inserting the dowel of one half of the load transfer member through a hole in the center plate and into the socket. During this insertion the bent or inclined fingers or lugs 21 hold the dowel in its correct relation to the socket, and preferably means, not shown, are provided for holding the dowel fully within the socket 12.

In order to properly position the two halves of the load transfer members in correct relation to the center plate, these halves of the load transfer member are provided with shoulders or parts which cannot pass through the hole in a center plate. For example, the part 9 of the load transfer member is provided at 40 and 40' with shoulders or projections which extend beyond the hole in the center plate and limit the extent to which the half 9 of the load transfer member can be passed through a hole in the center plate. The other half 8 of the load transfer member is provided at the end of the walls 18, 19 and 20 with outwardly extending beads or flanges 41 which also serve to engage the center plate about the hole therein. Consequently these shoulders or beads 40 and 41 and 40' limit the extent to which the two halves of the load transfer member may be pushed through a hole in the center plate, and the shoulders or beads and the holes in the center plate also serve to correctly position the load transfer members in angular relation to the center plate. When the two halves of the load supporting member are thus in correct relation to each other they are held in such relation by suitable pressure means, not shown. The two walls 19 and 20 of the socket member are then subjected to a hammer-like blow by a press which sets the inner surfaces of the two walls 19 and 20 tightly against the walls 30 and 31 of the dowel so that these surfaces are pressed tightly together. In the construction shown, the pressure of this hammer blow may be approximately 50 tons and the walls of the socket then remain tightly against the dowel without tending to spring away therefrom, with a friction which is ample to permit the center plate 13 with the various load transfer members mounted thereon to be positioned on a road bed in the usual manner. This friction is materially in excess of what has heretofore been applied to the two halves of a load transfer member and will securely hold these two halves in correct relation to each other during the shipping and handling of a center plate with the load transfer members mounted thereon, including the positioning of the same on a road bed and during the pouring of the concrete about the same, or vibrating these assemblies into plastic concrete. This high degree of friction which holds the two halves of a joint support together is not sufficient to hold these two parts together when subjected to the much greater forces resulting from contraction and expansion of the two slabs of concrete in which they are embedded.

By truing or coining the cooperating surfaces of the socket and dowel, a high degree of accuracy results when these coined or trued surfaces are pressed together, and the truing of these surfaces makes it possible to hold the two parts of the load supporting member in correct relation to each other as well as holding them together with a higher degree of friction than was heretofore provided between the two parts of the joint support.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A method of securing together two halves of a load transfer member at opposite sides of a center plate having apertures therein, said parts being castings, one of said parts having a dowel shaped to pass through an aperature and the other part having a three walled socket with two of said walls terminating in an open side, said method comprising:

pressing the upper and lower walls of the socket inwardly against a smooth steel bar with sufficient pressure to produce a smooth coined effect on the inner faces of said upper and lower socket walls, applying coining pressure to the upper and lower walls of the dowel to remove surface irregularities in the casting, passing said dowel through an aperture in the center plate and fitting said dowel into said socket, applying hammer-like blows to the upper and lower walls of the socket to provide a frictional engagement with the corresponding walls of the dowel.

2. A method according to claim 1 in which said two walls of the three walled socket have lugs extending outwardly beyond the open side, including the step of bending the lugs partly across the open side between the two walls while pressing the two walls against a hard bar to produce coined surfaces on the inner face of the walls.

References Cited

UNITED STATES PATENTS

| 2,207,085 | 7/1940 | Brickman | 94—18 |
| 2,263,150 | 11/1941 | Westcott | 94—18 XR |
| 2,269,703 | 1/1942 | Bagwill | 94—18 |
| 2,319,713 | 5/1943 | Williams | 94—18 |
| 3,288,039 | 11/1966 | Crone | 94—8 |
| 3,349,675 | 10/1967 | Webb | 94—8 |

JACOB L. NACKENOFF, Primary Examiner

U.S. Cl. X.R.

94—18